United States Patent

Daetwyler

[19]

[11] Patent Number: 5,785,325
[45] Date of Patent: Jul. 28, 1998

[54] SHAFT BEARING ON A MACHINE TOOL

[75] Inventor: Max Daetwyler, Bleienbach, Switzerland

[73] Assignee: MDC Max Datwyler Bleienbach AG, Bleienbach, Switzerland

[21] Appl. No.: 638,891

[22] Filed: Apr. 25, 1996

[30] Foreign Application Priority Data

Apr. 25, 1995 [CH] Switzerland .................. 01 180/95

[51] Int. Cl.$^6$ .................. B23B 31/171; B23B 31/30; B23B 33/00
[52] U.S. Cl. .................. 279/33; 82/167; 279/2.19; 279/106; 279/134; 279/4.01
[58] Field of Search .................. 279/33, 34, 4.01, 279/2.19, 2.2, 134, 135, 106; 82/167

[56] References Cited

U.S. PATENT DOCUMENTS

| | | | |
|---|---|---|---|
| 1,187,920 | 6/1916 | Muller | 279/33 |
| 1,770,515 | 7/1930 | Godfriaux | 279/33 |
| 2,154,908 | 4/1939 | Lewis | 279/106 |
| 2,890,889 | 6/1959 | Work | 279/114 |
| 3,698,729 | 10/1972 | Scharfen et al. | 279/114 |
| 4,981,057 | 1/1991 | Von Haas et al. | 279/72 |

FOREIGN PATENT DOCUMENTS

| | | | |
|---|---|---|---|
| 16533 | 3/1881 | Germany . | |
| 350131 | 3/1921 | Germany . | |
| 599708 | 6/1934 | Germany | 279/4.01 |
| 954024 | 11/1956 | Germany . | |
| 2020642 | 4/1971 | Germany . | |
| 2604876 | 8/1977 | Germany | 279/33 |
| 2848172 | 5/1980 | Germany | 279/4.01 |
| 1087264 | 4/1984 | U.S.S.R. | 279/106 |
| 534447 | 3/1941 | United Kingdom . | |
| 1593266 | 7/1981 | United Kingdom | 279/134 |

OTHER PUBLICATIONS

International Search Report, Swiss Appl. No. CH 118095, 21 Nov., 1995, F. Bogaert.

*Primary Examiner*—Steven C. Bishop
*Attorney, Agent, or Firm*—Bell Seltzer Intellectual Property Law Group of Alston & Bird LLP

[57] ABSTRACT

A shaft bearing for mounting the shaft ends of a rotating workpiece to be machined, especially an intaglio printing cylinder, has a rotatably mounted clamping chuck clamping the shaft end and having a hollow clamping head. The clamping head has gripping parts mounted so as to be radially adjustable relative to the longitudinal axis of the clamping head. Each gripping part is mounted rotatably about a pivot axis extending parallel to the longitudinal axis, and is guided, in a region distant from the pivot axis, along an arcuate guide track extending around the longitudinal axis. Each gripping part is configured so as to extend at a decreasing distance from the longitudinal axis and being movable relative to the guide track for the purpose of clamping the shaft end.

14 Claims, 7 Drawing Sheets

SHAFT BEARING ON A MACHINE TOOL

FIELD OF THE INVENTION

This invention relates to a shaft bearing on a machine tool for mounting a rotating workpiece to be machined and, more particularly, for mounting an intaglio printing cylinder to be machined.

BACKGROUND OF THE INVENTION

A shaft bearing of this type is known from U.S. Pat. No. 1,770,515 and has a rotatable clamping ring, in which the gripping parts are mounted pivotably. Each gripping part is provided, on the side facing away from the gripping face, with an oblique face which cooperates with the similarly configured guide face. The guide faces extend approximately tangentially relative to the circumference of the clamping ring and are arranged on fixed guide elements which are mounted pivotably in the clamping chuck. During a rotation of the clamping ring, the gripping parts, which bear with their oblique faces on the guide faces, are pivoted inwards counter to the force of return springs and retain the shaft end. Both the guide faces and the oblique faces cooperating with these and located on the gripping parts are relatively short, so that only slight movement of the gripping parts are possible. For this reason, this shaft bearing is suitable only for receiving shaft ends of a given diameter, for which the shaft bearing is designed.

SUMMARY OF THE INVENTION

An object of the present invention is to improve a shaft bearing of the abovementioned type, in such a way that the automatic clamping of shaft ends having different diameters, along with a high accuracy of the axial centering, is possible, without the shaft ends being damaged.

This object is achieved by providing a shaft bearing on a machine tool for mounting the shaft end having a pair of rotatably mounted clamping chucks for clamping the shaft end of the workpiece. The clamping chuck has gripping parts mounted in a hollow clamping head so as to be radially adjustable relative to the longitudinal axis of the machine tool. The gripping parts are rotatably mounted about a pivot axis extending parallel to the longitudinal axis of the clamping head. The gripping parts are guided along a guide track formed in a guide element and are movable relative to the associated guide track for clamping the shaft end of the workpiece. The guide tracks are arcuately curved and extend about the longitudinal axis of the clamping head at a decreasing distance from the longitudinal axis.

The particular course of the curved guide tracks around the longitudinal axis of the clamping head at a decreasing distance from this longitudinal axis ensures that, during the clamping operation, the gripping parts execute a uniform movement. This results in an exact centering of the clamped shaft end relative to the longitudinal axis of the clamping head. Furthermore, even with a compact design, the guide tracks can be made relatively long, thus making it possible, without resetting, to grip different types of shaft ends, the diameters of which vary within relatively wide limits.

The shaft bearing according to the invention affords the largest possible engagement or gripping area of the gripping parts relative to the shaft end in the case of the largest diameters and, even regarding shaft ends of smaller diameter, there is still a sufficiently large engagement or gripping area to prevent damage to the shaft end effectively, even where thin shafts are concerned. Furthermore, the advantage of the shaft bearing according to the present invention is that the adjusting mechanism can be designed relatively simply, so that the dimensions of the shaft bearing can be kept small, at least in the axial direction. This makes it possible, inter alia, to ensure an easy introduction of the workpiece into the shaft bearing by means of a lifting tool.

In a preferred version of the shaft bearing, the guide track extends at least approximately along a segment of an Archimedean spiral, with the result that, in the clamping state, the gripping parts are self-locking and there is no longer any need to load the gripping parts constantly with a pressure fluid. Operating reliability is thereby also afforded, even if an unforeseen pressure drop occurs in the feed conduits of the adjusting mechanism.

BRIEF DESCRIPTION OF THE DRAWINGS

Further advantages of the present invention from the following description. The invention is explained in more detail by means of examples represented in the diagrammatic drawings. In these.

DETAILED DESCRIPTION

The same reference symbols are used for the same elements in the figures, and the first explanations of an element apply to all the figures, unless expressly specified otherwise.

Figure 1:
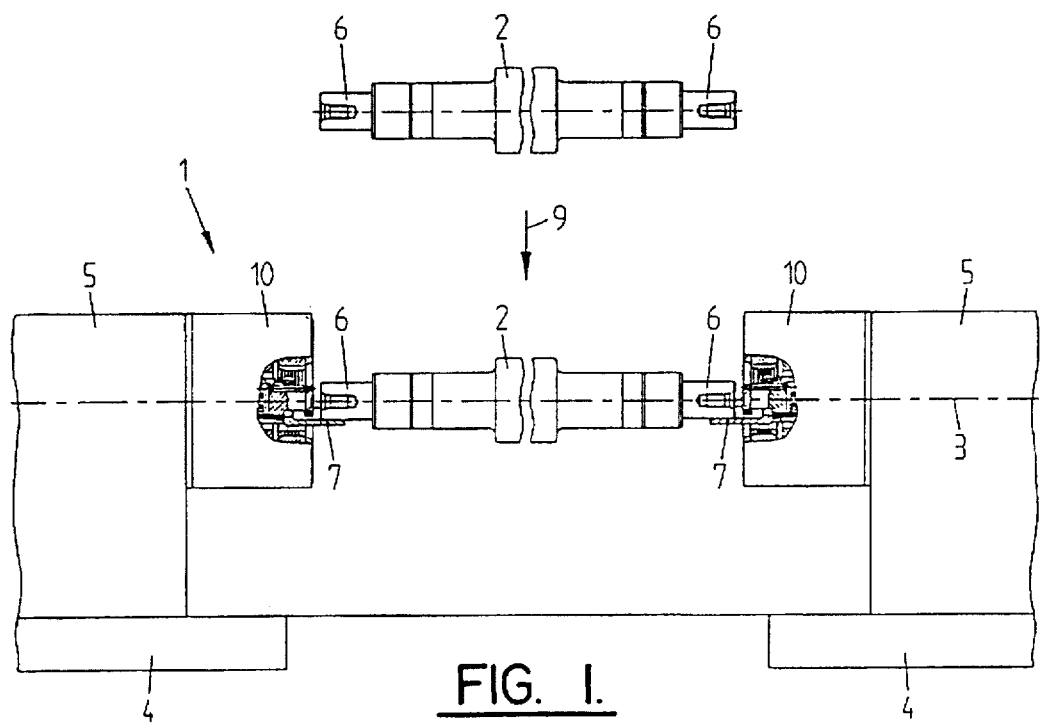
FIG. 1 shows, partly in projection and partly in cross-section, a machine tool with an extended shaft bearing for the purpose of introducing an intaglio printing cylinder.
Figure 2:
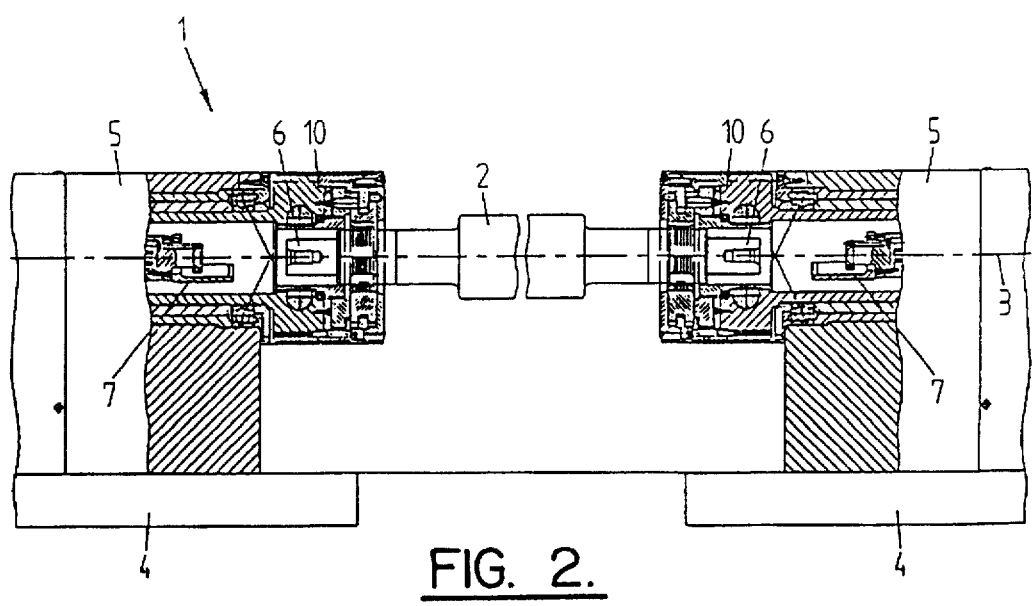
FIG. 2 shows the same machine tool as in FIG. 1 with the shaft bearing retracted for the purpose of clamping the intaglio printing cylinder.

FIGS. 1 and 2 represent, diagrammatically, a machine tool 1 for a workpiece 2, such as an intaglio printing cylinder, with two shaft bearings 5 which are each mounted on a machine slide 4 so as to be displaceable in the direction of the longitudinal axis 3 of the machine tool 1. The shaft ends 6 of the intaglio printing cylinder 2 are laid on two angular lifting arms 7 which are movable to and fro hydraulically or pneumatically within the shaft bearings 5 in the longitudinal axis 3 of the machine tool 1 by means of a cylinder/piston unit (not shown). As is evident, the intaglio printing cylinder 2 is laid with its shaft ends 6 from above onto the angular lifting arms 7 by means of a lifting crane indicated by the arrow 9. A clamping chuck 10 for receiving the shaft ends 6 is provided in each shaft bearing 5.

As is clear from FIG. 2, the two machine slides 4 are pushed towards the intaglio printing cylinder 2 held on the lifting arms 7, so that its shaft ends 6 can be received and clamped by the clamping chucks 10. When the shaft ends 6 of the intaglio printing cylinder 2 are clamped and centered, the lifting arms 7 are withdrawn within the respective shaft bearings 5, that is to say are moved away from the intaglio printing cylinder 2 by means of piston/cylinder units not shown, so that the shaft ends 6 are then held only by the clamping chucks 10 (the state represented in FIG. 2).

The exact design of the clamping chuck 10 is reproduced in FIGS. 3 to 9 and is explained with reference to these. FIGS. 4 to 7 show a projection or cross-sections according to the arrows and sectional lines E to C in FIGS. 3 and 10, and FIGS. 8 and 9 show the cross-sections along the sectional lines B and A in FIG. 3. The clamping chuck 10 consists of a clamping head 11 having arcuately curved gripping parts 12a, 12b, 12c which are mounted adjustably within this and which are designed with a rectangular cross-section. Furthermore, the clamping head 11 has an intermediate ring 13 and an outer flange 14 which are fastened to one another by means of screws 15 and which grip three guide elements or clamping-disc segments 16, arranged circumferentially about the longitudinal axis 3, in a recess 17 formed in a groove-like manner between them. This clamping head 11 is fastened on its end face, by means of screws 20, to a spindle flange 18 of a spindle 19 rotatable in the shaft bearing 5 (see FIG. 1).

A rotary drive tube 21 is mounted rotatably within the spindle flange 18 by means of a rolling or ball bearing 22 and is driven by two racks 23 located opposite one another and movable to and fro in the spindle flange. These racks 23 engage in an external toothing 24 on the circumference of the rotary drive tube 21. On the side facing the clamping head 11, an annular disc 26 is fastened to the rotary drive tube 21 in a rotationally drivable manner by means of a serration or spline connection 25. This annular disc 26 is mounted rotatably on a roller bearing 26a within the intermediate ring 13 and carries three bearing or driving bolts 27 which, on their end face, engage against the clamping parts 12 and into these and which are distributed at an angle of 120° to one another in the circumferential direction of the annular disc 26. These driving bolts 27 form pivot axes for the gripping parts 12a, 12b and 12c. A bearing disc 28 is screwed to the spindle flange 18 by means of screws 29 between the spindle flange 18 and the annular disc 26. This bearing disc 28 serves for guiding the annular disc 26 axially between the clamping head 11 and the spindle flange 18. Provided on that end face of the outer flange 14 facing the gripping parts 12a, 12b and 12c are three guide grooves 30 which are in the form of an arc of a circle and which extend along an arc segment at a decreasing distance from the longitudinal axis 3. Into each guide groove 30 engages a guide pin 31 which is provided on that end face of a respective gripping part 12a, 12b or 12c facing the outer flange 14.

Figure 3:
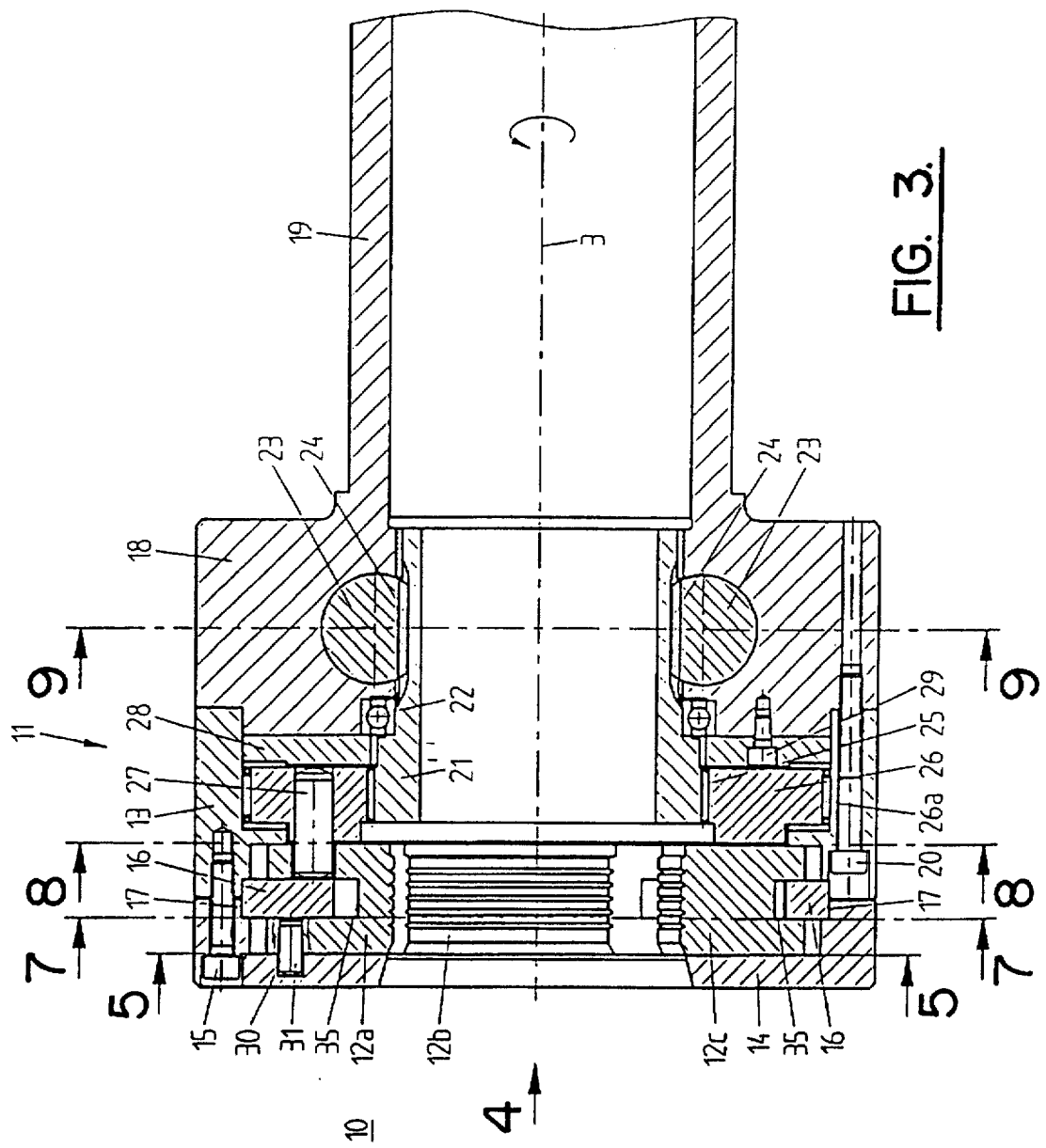
FIG. 3 shows a section in the longitudinal or axial direction through a clamping chuck formed on a spindle and having a clamping head and gripping parts.
Figure 4:
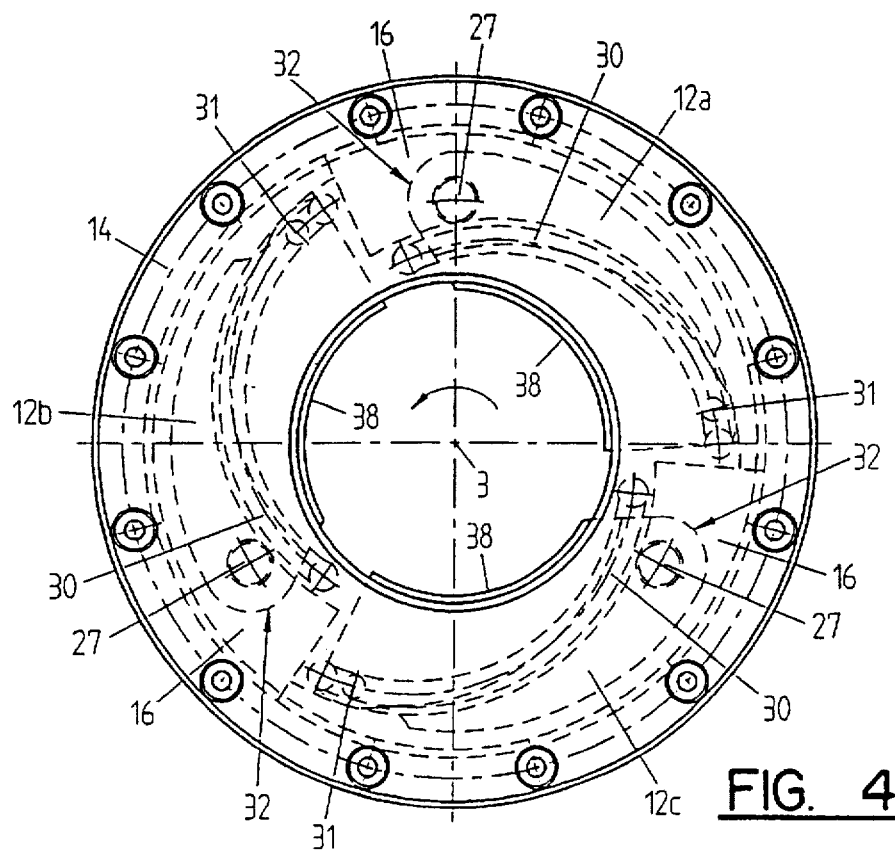
FIG. 4 shows a top view of a clamping chuck in the direction of the arrow E of FIG. 3 and FIG. 10.
Figure 10:
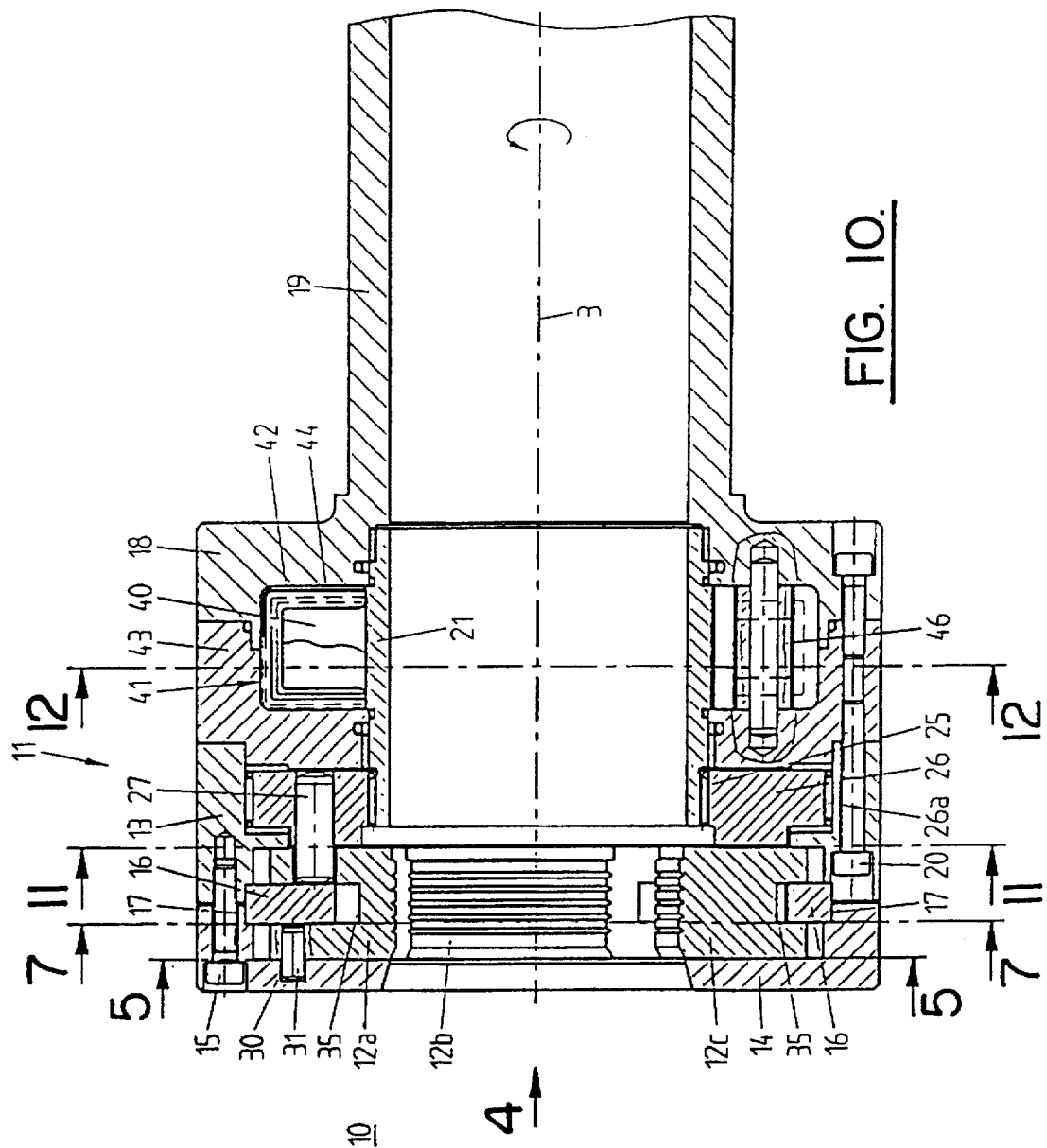
FIG. 10 shows a clamping chuck similar to that in FIG. 3 in longitudinal section, with an alternative version of the drive of the rotary drive tube.

In FIG. 4, which shows a projection in the direction of the arrow E of FIGS. 3 and 10, the abovementioned guide grooves 30 are indicated by broken lines and can be seen clearly at their decreasing distance from the longitudinal axis 3. The contours of the gripping parts 12a, 12b and 12c, being represented by broken lines, can likewise be seen. The driving bolt 27 provided in that end region 32 of the respective gripping part 12a, 12b or 12c which is on the left, as seen in the counterclockwise direction, is also shown by broken lines. Furthermore, the clamping-disc segments 16 indicated by broken lines can also be seen.

These structural elements are even more clearly evident from FIGS. 5 to 8 which represent the respective cross-sections through the clamping head 11 along the lines D—D (FIGS. 5 and 6), C—C and D—D. In particular, the guide track 33 of the respective clamping-disc segments 16 which is assigned to the respective gripping part 12a, 12b or 12c is specified. The gripping parts 12a, 12b and 12c have a groove 35 which is set in on the outer arc face 34 and which extends along an arcuate line at a decreasing distance from a longitudinal axis 3. This groove 35 terminates in a boss-like support 36 which is provided in the end region 37 of the respective gripping part 12a, 12b or 12c. The guidance of the boss-shaped support 36 on the guide track 33 can be seen clearly in FIG. 5. Moreover, FIG. 5 reveals that the groove 35 has a greater curvature than the guide track 33 of the associated clamping-disc segment 16, and therefore the bottom of the groove 35 will never touch the guide track 33 during a rotation of the respective gripping part 12a, 12b or 12c in the counterclockwise direction. Consequently, only the boss-shaped support 36 lies on the guide track 33 and there is always sufficient clearance between the groove 35 and the guide track 33 (see also FIG. 6).

Figure 5:
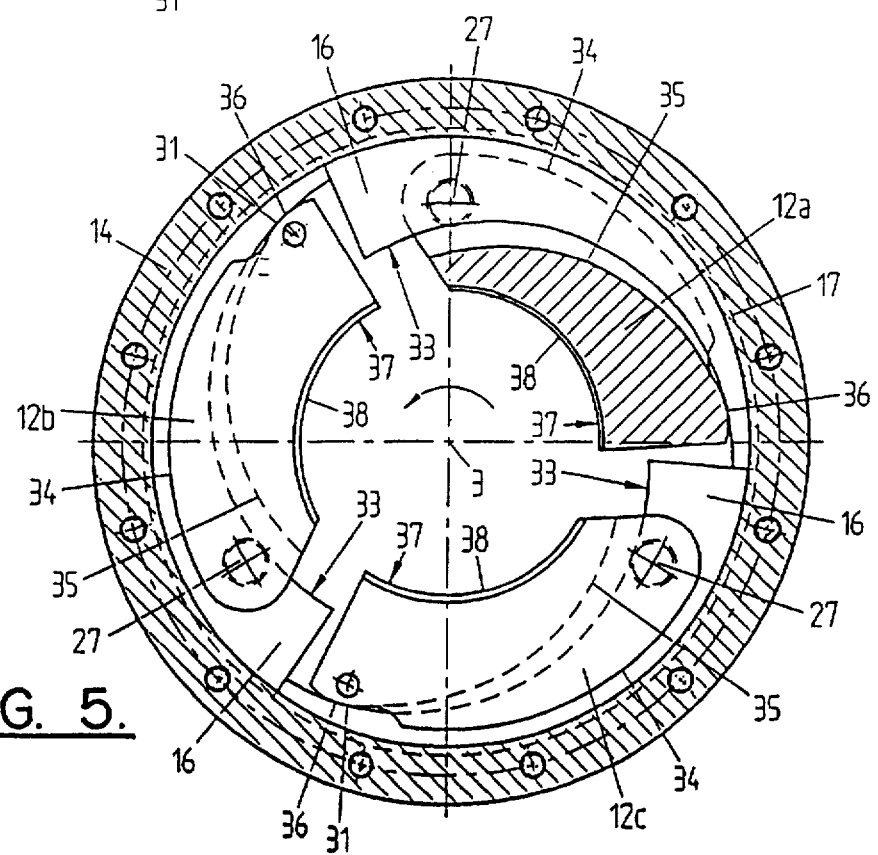
FIG. 5 shows a cross-section through the clamping chuck along the line D—D in FIG. 3 and in FIG. 10.
Figure 6:
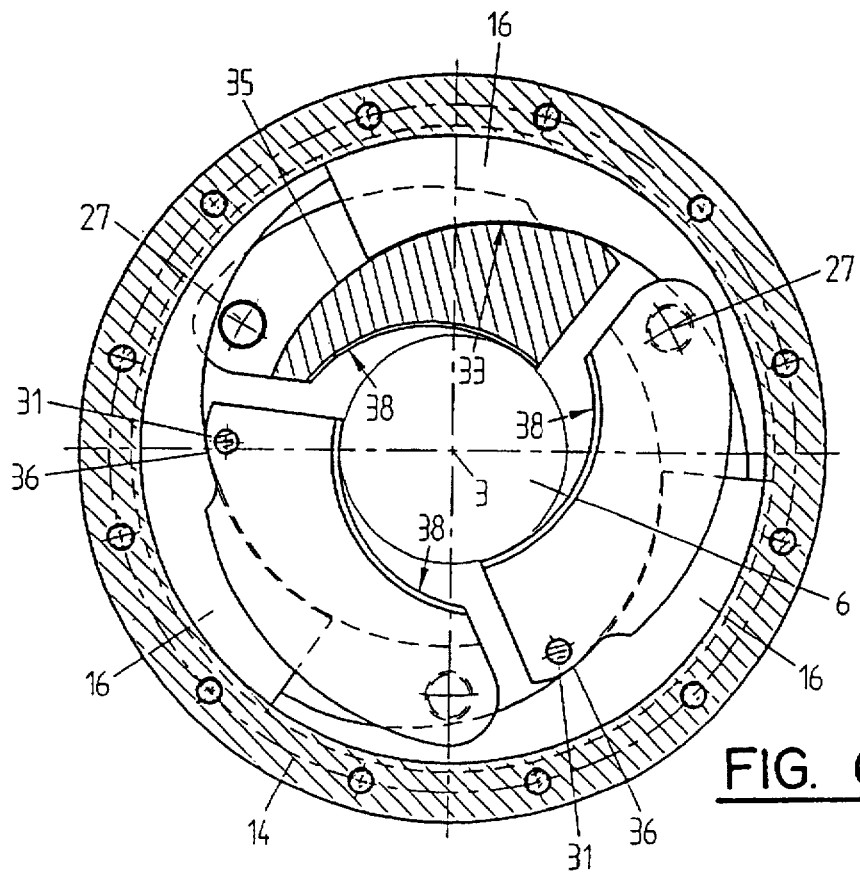
FIG. 6 shows the same cross-section as in FIG. 5 with a shaft end of smaller diameter.
Figure 7:
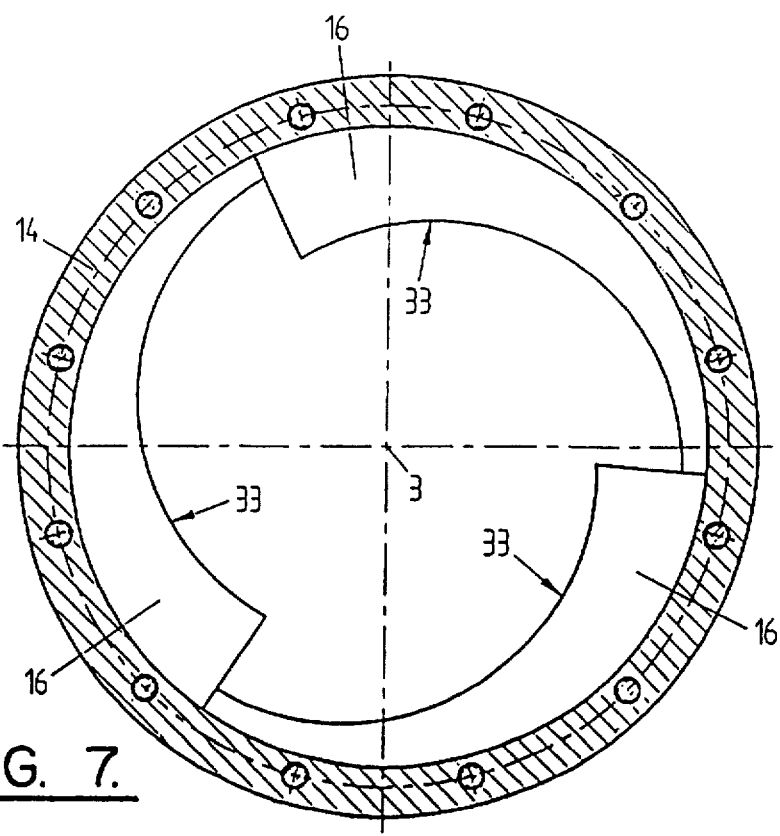
FIG. 7 shows a cross-section through the clamping chuck without gripping parts along the line CC in FIG. 3 and in FIG. 10.
Figure 8:
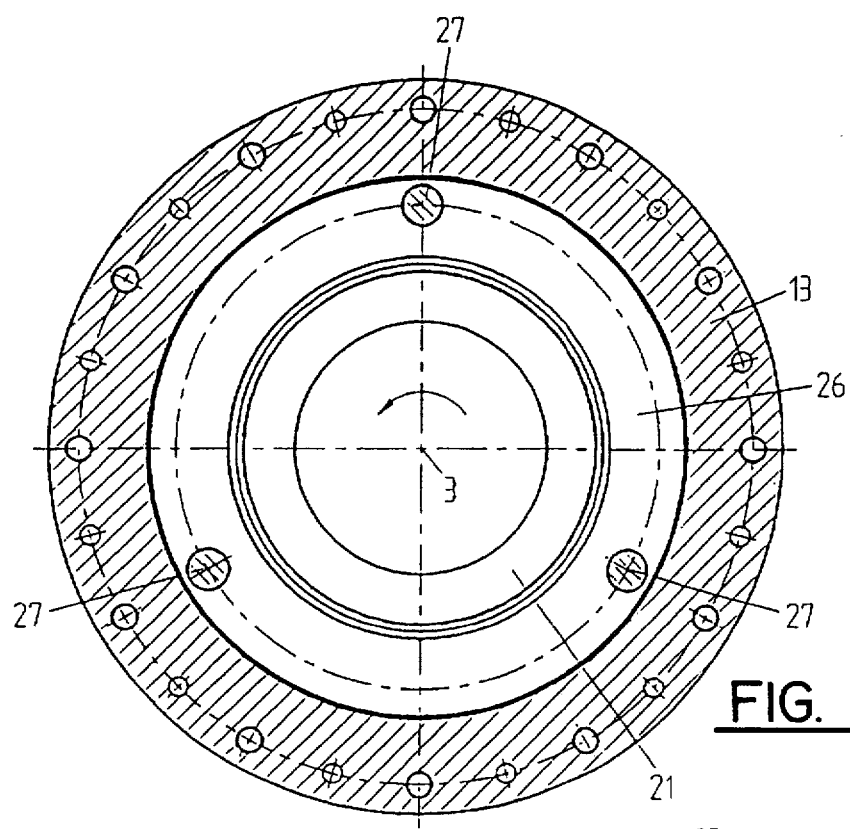
FIG. 8 shows a cross-section through the clamping chuck along the line B—B in FIG. 3.

The shape of the clamping-disc segments 16 together with their guide tracks 33 can be seen primarily from FIG. 7. The guide tracks 33 advantageously extend at least approximately along an Archimedean spiral having a pitch of 3° to 8° and, more specifically, about 6.5°. As can be seen from FIGS. 4 and 5, the arcuate inner faces 38 of the gripping parts 12a, 12b and 12c are designed circular-cylindrically and, in the outermost rotary position, encompass the largest diameter of a shaft end 6 of the workpiece or intaglio printing cylinder 2 (FIG. 5). With an increasing rotation of the gripping parts 12a, 12b and 12c via the respective guide tracks 33, the receiving orifice delimited by the arcuate inner faces 38 becomes smaller (see FIG. 6).

Figure 9:
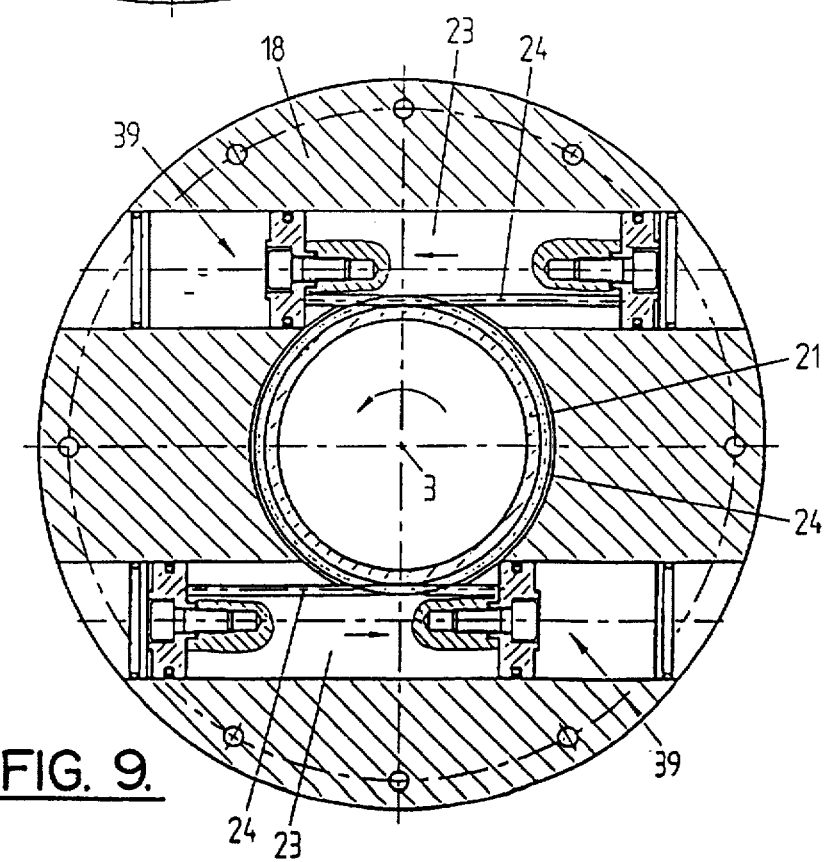
FIG. 9 shows a cross-section through the clamping chuck along the line A—A in FIG. 3.

The drive and guidance of the racks 23 within the spindle flange 18 can be seen in FIG. 9. These racks 23 are each moved to the left or to the right in the drawing by a double-acting piston/cylinder unit 39. The connections to a hydraulic or pneumatic pump, feed conduits and associated valves are generally known and are therefore not shown further here. As a result of the displacement of the racks 23, the rotary drive tube 21 is rotated in the counterclockwise direction or clockwise direction by means of its external toothing 24. This simultaneously brings about a rotation about longitudinal axis 3 of the driving bolts 27, fastened to the annular disc 26 splined to drive tube 21, and therefore a rotation of the gripping parts 12a, 12b and 12c along their respective guide tracks 33 on the clamping-disc segments 16. The guide pins 31 in the grooves 30 (FIG. 4) serve merely for preventing the gripping part 12a, 12b and 12c from falling inwards towards the longitudinal axis 3 when the shaft end 6 is not inserted. The gripping function of a respective gripping part 12a, 12b and 12c is therefore exerted solely by the boss-like support 36 on the guide track 33 on the clamping-disc segment 16.

The exact mode of operation of the shaft bearing 5 described above in all particulars is as follows:

After the intaglio printing cylinder 2 has been deposited with its shaft ends 6 on the lifting arms 7, the machine slides 4 are moved inwards, with the result that the two clamping chucks 10 engage around the shaft ends 6. Subsequently, by means of the above described adjusting mechanism, the gripping parts 12 are rotated about the driving bolts 27 as a result of the rotation of the driving bolts 27 about longitudinal axis 3, in a manner guided by the boss-like supports 36 bearing on the guide track 33, until the shaft end 6 is gripped between the gripping parts 12. By virtue of the shape of the guide tracks 33 as an Archimedean spiral, self-locking occurs between the respective gripping part 12a, 12b and 12c and the cylindrical shaft end 6, so that the shaft ends 6 can no longer be released without a counterrotation of the gripping parts 12a, 12b and 12c. For this reason, the further loading of the piston/cylinder units 39 with hydraulic fluid could be dispensed with. In practice, however, non-return valves are installed in the feed conduits, the said non-return valves maintaining the pressure in the piston-cylinder units 39, in order to switch the feed conduits to the pressureless state after the gripping of the shaft ends 6.

Of course, this self-locking also occurs in the case of relatively small diameters of the shaft ends 6, as indicated by way of example in FIG. 6. Even in the outermost position of the gripping parts 12a, 12b and 12c on the respective guide tracks 33, there is still sufficient engagement area between the circular-cylindrical shaft end 6 and the arcuate inner faces 38 to achieve the said self-locking.

Figure 11:
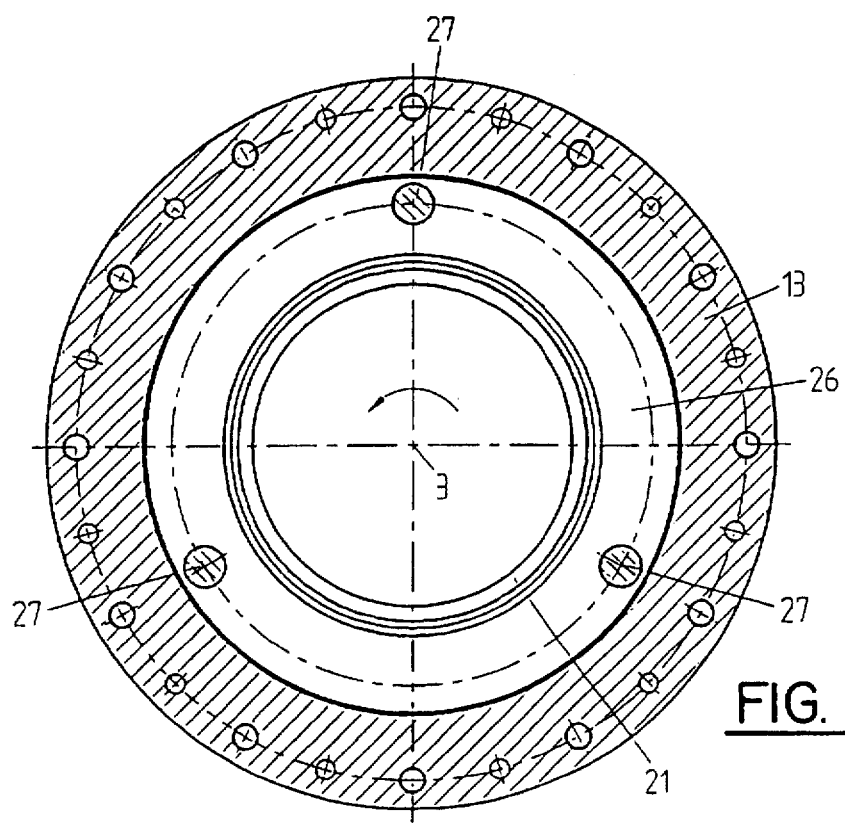
FIG. 11 shows a cross-section through the clamping chuck along the line B—B in FIG. 10.
Figure 12:
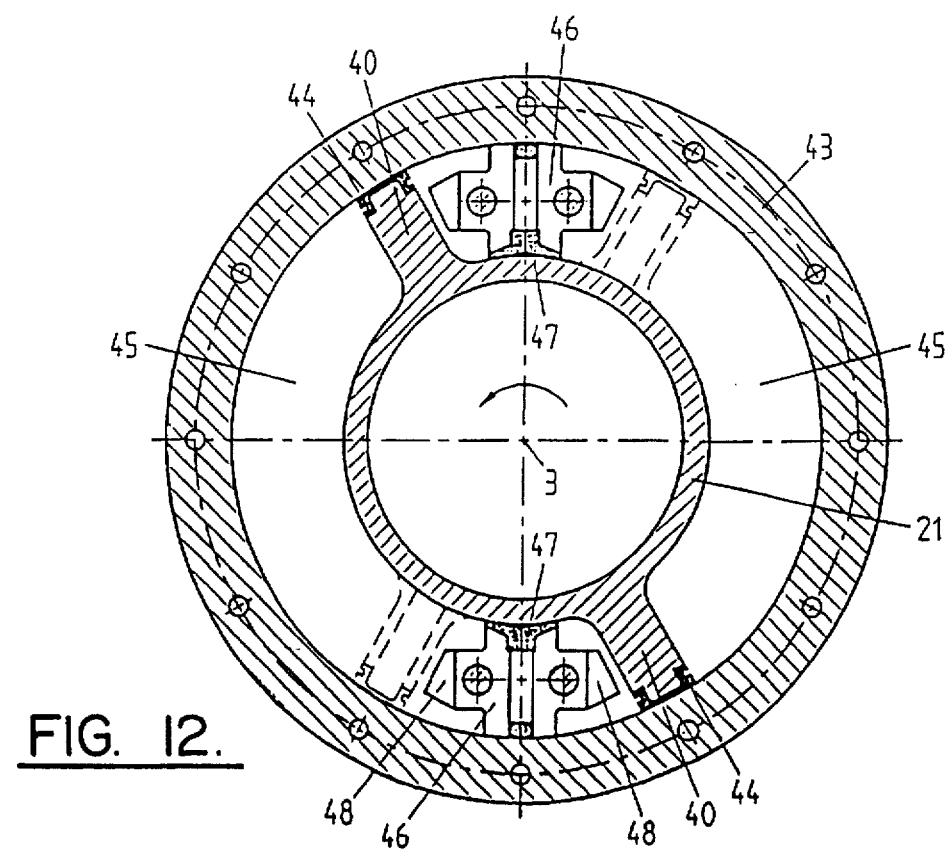
FIG. 12 shows a cross-section through the clamping chuck along the line A—A in FIG. 10.

FIGS. 10 to 12 represent an alternative version of the drive for the rotary drive tube 21. The clamping head 11 of the clamping chuck 10 of this version is completely identical to that shown in FIGS. 3 to 9, and therefore a further explanation of the corresponding structural parts can be dispensed with here. In this case, however, the racks 23 and the piston/cylinder units 39 of the first version are replaced by a pure hydraulic or pneumatic drive. The rotary drive tube 21 is provided with two radial rotary vanes 40 which are located diametrically opposite one another and which extend towards the bottom 41 of an annular groove 42 provided in the spindle flange 18 and in a second intermediate ring 43 bearing on the latter. The rotary vanes 40 are provided on the end face with a cap-shaped gasket 44 and are each rotatable within an annular chamber 45, the said annular chambers being formed in the annular groove 42 by two radial separating elements 46 located diametrically opposite one another. These separating elements 46 are each sealed off relative to the rotary drive tube 21 by means of a T-shaped gasket 47. Furthermore, stops 48 are provided in the circumferential direction on the sides of these separating elements 46, in order to limit the rotation of the rotary vanes 40. The other end position of the rotary vanes 40 is represented by broken lines.

The rotary vanes 40 are then loaded with a hydraulic or pneumatic fluid which is pumped in to one of the two portions or part spaces of the annular chamber 45 which are formed between the rotary vane 40 and the separating elements 46. As soon as the gripping parts 12a, 12b and 12c have gripped the shaft end 6 completely as a result of the rotation of the rotary drive tube 21, the pressure in the respective portion or part space of the annular chamber rises to a maximum. Subsequently, as a consequence of the abovementioned self-locking, this hydraulic or pneumatic drive can be made pressureless, either entirely or only the feed conduits provided with non-return valves, as mentioned above. The rotation of the rotary drive tube 21 can also be brought about by means of one rotary vane 40, in which case a single radial separating element 46 is necessary.

As is apparent to one of ordinary skill in the art, the basic mode of operation of the shaft bearing according to the present invention can also be achieved if the clamping-disc segments 16 are mounted rotatably relative to the gripping parts 12a, 12b and 12c fastened to the clamping head 11 and pivotable about a fixed pivot axis. Also, the design of the inner faces 38 of the gripping parts 12a, 12b and 12c does not necessarily have to be arcuate, but can be made at least partially wedge-shaped, in order to achieve the abovementioned self-locking.

In the drawings and specification there has been set forth a preferred embodiment of the invention and, although specific terms are employed, they are used in a generic and descriptive sense only and not for purposes of limitation, the scope of the invention being set forth in the following claims:

I claim:

1. A shaft bearing on a machine tool for mounting a shaft end of a rotating workpiece to be machined, said shaft bearing comprising a rotatably mounted clamping chuck for clamping the shaft end and having a plurality of gripping parts which are mounted in a hollow clamping head so as to be radially adjustable relative to a longitudinal axis of the machine tool, wherein each of said plurality of gripping parts is mounted rotatably about a pivot axis extending parallel to a longitudinal axis of the clamping head and is guided, in a region distant from the pivot axis, along a guide track formed on a guide element and is movable relative to the associated guide track for clamping said shaft end of said workpiece, wherein the guide tracks are arcuately curved and extend about the longitudinal axis of the clamping head at a decreasing distance from the longitudinal axis of the clamping head, and wherein each gripping part is guided by a pin which engages a guide groove extending laterally relative to the gripping parts and approximately parallel to the guide track and which is arranged parallel to the pivot axis of the gripping part.

2. A shaft bearing according to claim 1, wherein a center line of the guide tracks lies in a plane extending essentially at right angles to the longitudinal axis of the clamping head.

3. A shaft bearing according to claim 1, wherein the pivot axis of each of the gripping parts is formed by a bearing bolt parallel to the longitudinal axis of the clamping head.

4. A shaft bearing according to claim 3, wherein the bearing bolts are movable along a circular path concentric relative to the longitudinal axis of the clamping head.

5. A shaft bearing according to claim 1, wherein each gripping part comprises an approximately circular-cylindrical gripping face and a rectangular cross-section and is guided on the guide track on a side facing away from the gripping face.

6. A shaft bearing according to claim 5, wherein each gripping part has, on the side facing away from the gripping face, a groove, which cooperates with a clamping-disc segment for lateral guidance of the gripping part.

7. A shaft bearing according to claim 1, wherein each guide track extends at least approximately along a segment of an Archimedean spiral.

8. A shaft bearing according to claim 4, wherein the bearing bolts are fastened to an annular disc rotatable relative to the clamping head and the guide elements are retained fixedly on the clamping head.

9. A shaft bearing according to claim 8, wherein the annular disc is in rotary drive connection with a rotary drive tube rotatably mounted coaxially relative to the longitudinal axis of the clamping head.

10. A shaft bearing according to claim 9, wherein the annular disc is connected to the rotary drive tube by means of a toothing or serration.

11. A shaft bearing according to claim 9, wherein the rotary drive tube is provided with an external toothing which is in engagement with at least one rack movable to and fro by a piston/cylinder unit.

12. A shaft bearing according to claim 9, wherein the rotary drive tube forms, with a housing surrounding the rotary drive tube, an annular chamber which is subdivided in a circumferential direction by at least one radial separating element, and on the rotary drive tube is provided at least one radially projecting rotary vane which subdivides the annular chamber into two variable part spaces, one of which is in each case loaded by a pressure fluid for the purpose of rotating the rotary drive tube.

13. A shaft bearing according to claim 12, wherein the annular chamber is divided into two annular chambers by a second radial separating element and a radially projecting rotary vane on the rotary drive tube projects into each annular chamber.

14. A shaft bearing according to claim 12, wherein the radial separating elements have stops for the rotary vane.

* * * * *